United States Patent
Sumida

(10) Patent No.: US 11,120,947 B2
(45) Date of Patent: Sep. 14, 2021

(54) CONNECTION STRUCTURE OF POWER STORAGE ELEMENTS AND POWER STORAGE MODULE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Tatsuya Sumida, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 36 days.

(21) Appl. No.: 16/610,308

(22) PCT Filed: Apr. 25, 2018

(86) PCT No.: PCT/JP2018/016710
§ 371 (c)(1),
(2) Date: Nov. 1, 2019

(87) PCT Pub. No.: WO2018/207620
PCT Pub. Date: Nov. 15, 2018

(65) Prior Publication Data
US 2020/0082992 A1    Mar. 12, 2020

(30) Foreign Application Priority Data
May 11, 2017   (JP) .............................. JP2017-094550

(51) Int. Cl.
*H01G 9/008*   (2006.01)
*H01G 2/04*   (2006.01)
(Continued)

(52) U.S. Cl.
CPC ............... *H01G 9/008* (2013.01); *H01G 2/04* (2013.01); *H01G 9/08* (2013.01); *H01G 11/10* (2013.01); *H01G 11/76* (2013.01)

(58) Field of Classification Search
None
See application file for complete search history.

(56) References Cited

U.S. PATENT DOCUMENTS 5,373,418 A * 12/1994 Hayasi ................ H01L 23/3675
361/707
9,484,154 B2 * 11/2016 Honda ..................... H01G 2/02
(Continued)

FOREIGN PATENT DOCUMENTS

JP    2002-134870 A    5/2002
JP    2006-252792 A    9/2006
(Continued)

OTHER PUBLICATIONS

International Search Report, Application No. PCT/JP2018/016710, dated Jul. 17, 2018. ISA/Japan Patent Office.

*Primary Examiner* — Dion Ferguson
(74) *Attorney, Agent, or Firm* — Honigman LLP

(57) ABSTRACT

Provided is a connection structure for connecting electrodes of a plurality of capacitors, including: a circuit board that includes power source patterns and through holes into which the electrodes are inserted, the circuit board being placed on the capacitors; bolts that include shaft portions that are inserted into the through holes and are screwed into the electrodes of the capacitors and head portions that are formed integrally with the shaft portions and press the power source patterns to the electrodes via the circuit board, and spacer portions that are arranged in the through holes and support the bolts.

10 Claims, 7 Drawing Sheets

(51) Int. Cl.
*H01G 9/08* (2006.01)
*H01G 11/10* (2013.01)
*H01G 11/76* (2013.01)

(56) References Cited

U.S. PATENT DOCUMENTS

| | | | | |
|---|---|---|---|---|
| 2002/0140368 | A1* | 10/2002 | Matsunaga | H01G 9/08 315/185 S |
| 2006/0050468 | A1* | 3/2006 | Inoue | H05K 3/301 361/328 |
| 2008/0171259 | A1* | 7/2008 | Kanai | H01M 50/20 429/53 |
| 2008/0265586 | A1* | 10/2008 | Like | H05K 7/20854 290/38 R |
| 2010/0033900 | A1* | 2/2010 | Miura | H01G 9/08 361/502 |
| 2014/0120393 | A1 | 5/2014 | Desbois-Renaudin et al. | |
| 2014/0328008 | A1* | 11/2014 | Honda | H01G 11/82 361/535 |
| 2019/0237271 | A1* | 8/2019 | Kim | H01G 11/10 |

FOREIGN PATENT DOCUMENTS

| | | |
|---|---|---|
| JP | 2007-294656 A | 11/2007 |
| JP | 2010-225929 A | 10/2010 |
| JP | 2014-197512 A | 10/2014 |

* cited by examiner

CONNECTION STRUCTURE OF POWER STORAGE ELEMENTS AND POWER STORAGE MODULE

CROSS-REFERENCE TO RELATED APPLICATIONS

This application is the U.S. national stage of PCT/JP2018/016710 filed on Apr. 25, 2018, which claims priority of Japanese Patent Application No. JP 2017-094550 filed on May 11, 2017, the contents of which are incorporated herein.

TECHNICAL FIELD

The present specification discloses a technology related to a connection structure of power storage elements and a power storage module.

BACKGROUND

Conventionally, for example, a capacitor device disclosed in JP 2013-131734A has been known as an auxiliary power supply that is used in an emergency when a main power supply cannot be used.

In this technology, a plurality of capacitors including electrodes and safety valves for releasing abnormal pressure are housed in a housing case. On the upper face, bus bars are respectively arranged and fixed with screws between the electrodes, and a circuit board for controlling the balance of power storage elements and the like is fixed and held in one piece with the capacitor in a region excluding the electrodes and the safety valves.

However, with this configuration, in order to electrically connect the capacitors, it is necessary to attach a circuit board to the capacitors, in addition to bus bars, the number of which corresponds to the number of the electrodes. For this reason, the number of parts and assembly man-hours increase, which leads to an increase in cost.

The technology disclosed in the present specification is made in view of the above circumstances, and an object thereof is to provide, at a low cost, a connection structure of power storage units and a power storage module that can connect power storage elements with each other and hold a circuit board, the connection structure and the power storage module having a small number of parts.

SUMMARY

The connection structure for connecting electrodes of a plurality of power storage elements according to the technology disclosed in the present specification includes: a circuit board that includes power source patterns and through holes into which the electrodes are inserted, the circuit board being placed on the power storage elements; fastening members that include shaft portions that are inserted into the through holes and screwed into the electrodes of the power storage elements, and pressing portions that are formed integrally with the shaft portions and press the power source patterns to the electrodes via the circuit board, and spacers that are arranged in the through holes and support the pressing portions.

With this configuration, it is possible to fasten the circuit board to the power storage elements and electrically connect the power source patterns to the electrodes by merely placing the circuit board on the electrodes of the plurality of power storage elements and screwing the fastening members to the electrodes, and thus the number of parts and man-hours can be reduced. Furthermore, since the spacers are disposed in the through holes of the circuit board, it is possible to restrict a pressing force of the fastening members acting on the circuit board.

A configuration is also possible in which the power source patterns each include a plurality of contact portions that are exposed on a surface of the circuit board, and the fastening members respectively press the contact portions respectively to the electrodes of the plurality of power storage elements via the circuit board.

With this configuration, the plurality of power storage elements can be connected to each other by merely fastening one circuit board to the plurality of power storage elements, and thus the number of parts and man-hours can be reduced.

A configuration is also possible in which conductive plating layers are formed on inner walls of the through holes, and the power source patterns each include a first power source pattern that is arranged on the electrode side and is pressed to the electrode, and a second power source pattern that is stacked on the first power source pattern via an insulative layer and is electrically connected to the first power source pattern via the plating layer.

With this configuration, if the first power source pattern is pressed to the electrodes, the second power source pattern formed on the layer different from the layer on which the first power source pattern is formed can also be connected to the electrodes. This makes it possible to allow a larger current to flow.

A configuration is also possible in which control circuits for controlling a state of the power storage elements are provided on the circuit board, and a signal pattern that connects the power source patterns to the control circuit is formed on the circuit board.

With this configuration, an electrical wire for connecting the control circuit to the electrodes is no longer needed, and thus the number of parts can be reduced.

Furthermore, a power storage module according to the technology disclosed in the present specification includes: a plurality of power storage elements; a case that houses the plurality of power storage elements; a circuit board including power source patterns and through holes into which the electrodes of the power storage elements are inserted; fastening members that include shaft portions that are inserted into the through holes and are screwed into the electrodes of the power storage elements and pressing portions that are formed integrally with the shaft portions and press the power source patterns to the electrode of the power storage elements via the circuit board; spacers that are arranged in the through holes and support the pressing portions; and caps that are arranged between the power storage elements and the circuit board, wherein the power storage element includes a safety valve that is opened when an internal pressure surpasses a predetermined value, and the caps each include a cover portion that is arranged between the circuit board and the safety valve and that covers the safety valve, and a release groove portion that guide gas discharged from the safety valve in the direction away from the circuit board.

With this configuration, since the circuit board is separated from the safety valves via the caps, even if gas is ejected from the safety valve, the influence of the gas can be reduced.

A configuration is also possible in which the circuit board is supported by the electrodes and circuit board support portions that protrude from the caps.

ADVANTAGEOUS EFFECTS OF DISCLOSURE

According to the technology disclosed in the present specification, it is possible to provide, at a low cost, a connection structure of power storage units and a power storage module that can connect power storage elements to each other and hold a circuit board, the connection structure of the power storage module having a small number of parts.

DETAILED DESCRIPTION OF PREFERRED EMBODIMENTS

First Embodiment

Figure 1:
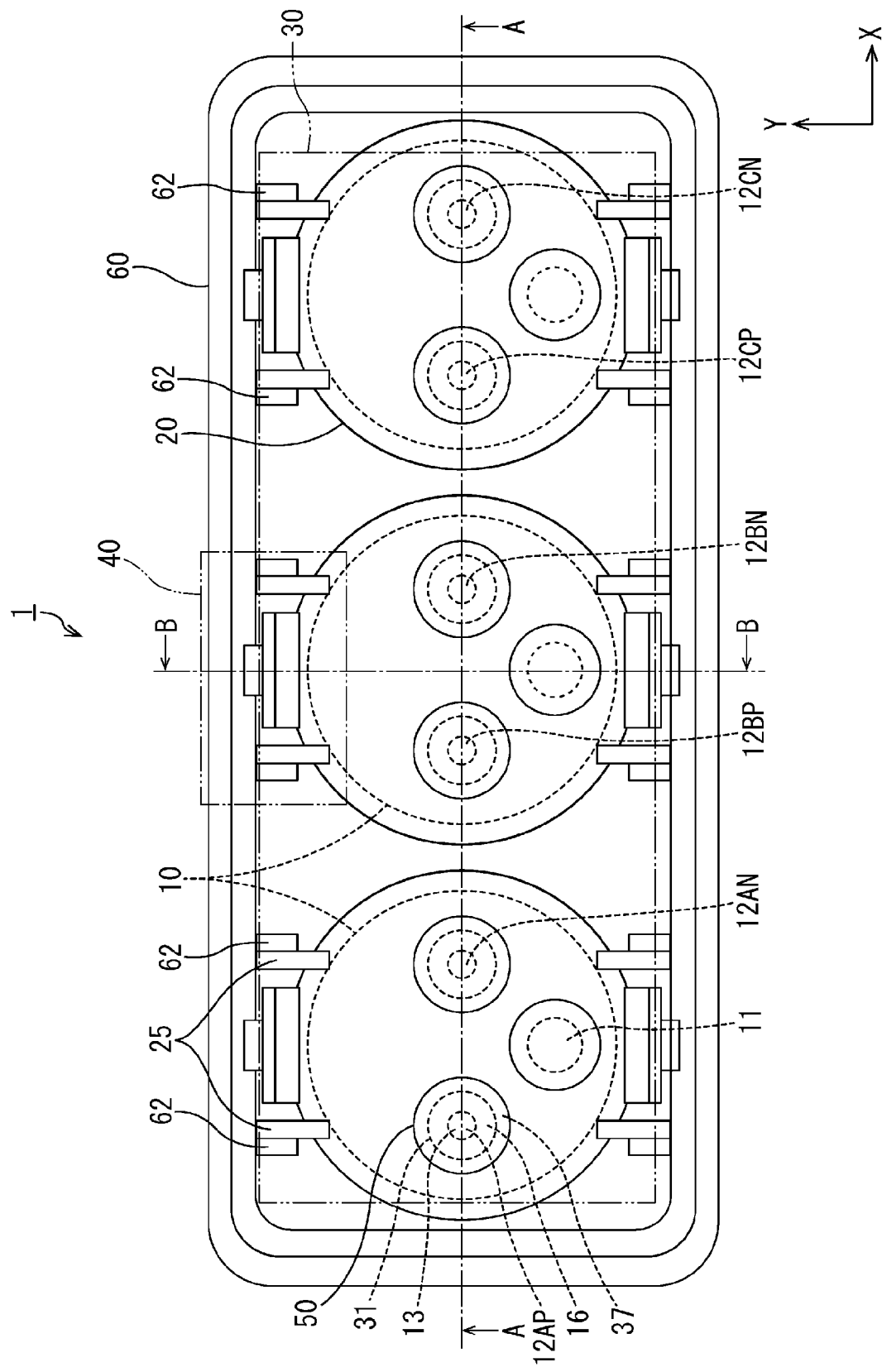
FIG. 1 is a top view showing a power storage module of a first embodiment.

Hereinafter, a first embodiment according to the technology disclosed in the present specification will be described with reference to FIGS. 1 to 6. Note that in the following description, a direction X in the drawings is taken as rightward, a direction Y as frontward, and a direction Z as upward. Also, in the following description, there are cases where only part of a plurality of identical members are denoted by a reference numeral, while the reference numeral is omitted with respect to the other members.

Figure 2:
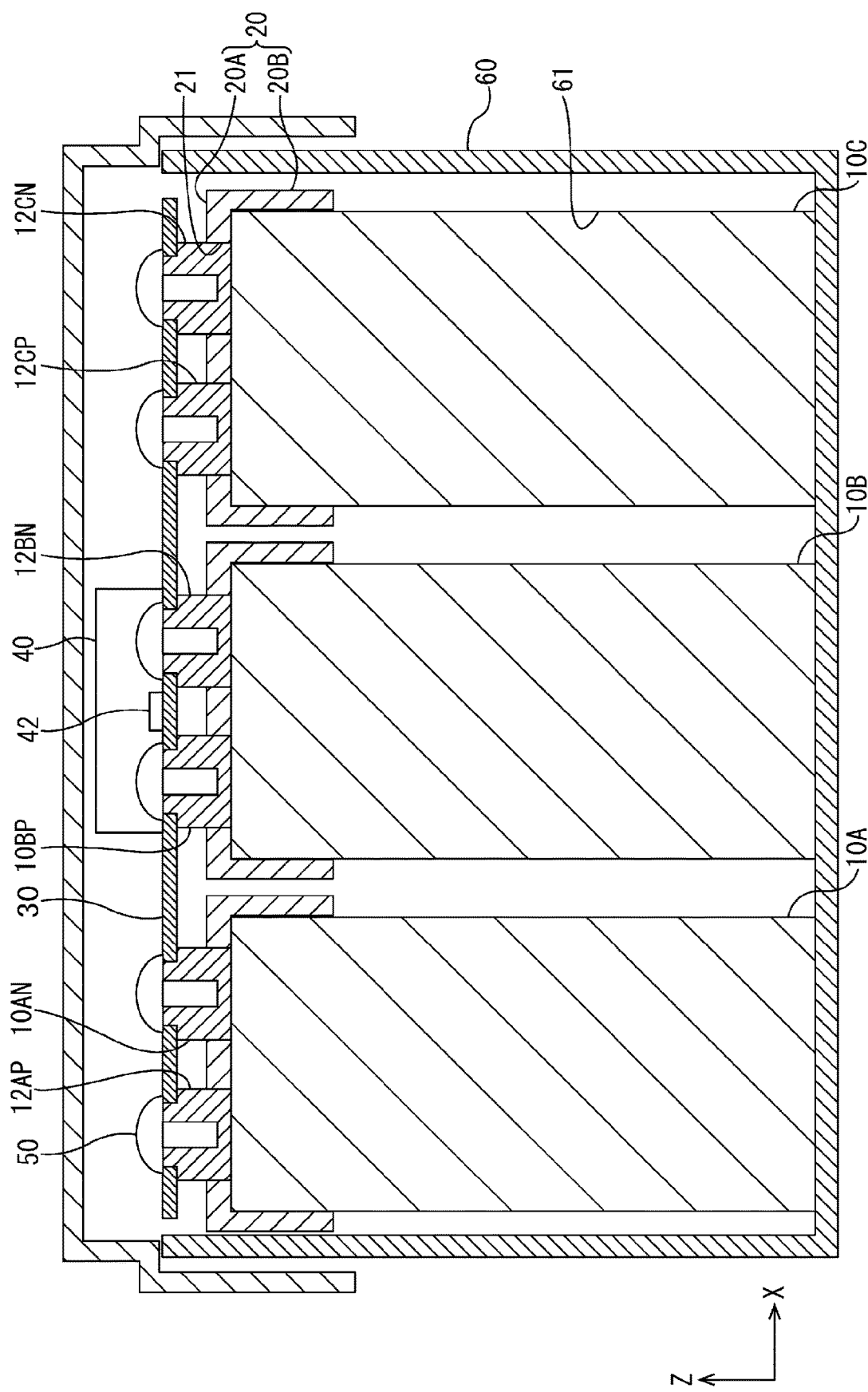
FIG. 2 is a cross-sectional view taken along line A-A in FIG. 1.

A power storage module 1 of the present embodiment is to be installed in a vehicle as a sub power supply that is used when a main power supply cannot operate. As shown in FIGS. 1 and 2, in the power storage module 1, capacitors 10 formed by a plurality (in the present embodiment, three) of capacitors 10 (an example of power storage elements) are housed in a case 60, and a circuit board 30 is placed on the capacitors 10 and fastened to electrodes 12 with bolts 50. Caps 20 are arranged between the circuit board 30 and the capacitors 10. As will be described later, the circuit board 30 is arranged to electrically connect the capacitors 10 with each other and control the state of the capacitors 10. Note that the circuit board 30 is not illustrated in detail in FIG. 1, and only its outline is shown by the two-dot chain line C.

The case 60 is shaped like a cuboid that opens upward, and a plurality (in the present embodiment, three) of cylinder-shaped capacitor housing portions 61 are arranged side by side in the case 60. The capacitor housing portions 61 open upward, and as shown in FIG. 1, a pair of guide ribs 62 for positioning the caps 20 are arranged in the front-rear direction in the regions in the front and rear of the opening edges.

Cylinder-shaped capacitor body portions of the capacitors 10A to 10C are arranged inside the capacitor housing portions 61 in a state in which the electrodes 12 face upward and positive electrodes P and negative electrodes N are alternatingly arranged side by side. Safety valves 11 are provided rearward of the electrodes 12. The safety valves 11 are opened when the internal pressure of the capacitors 10 reaches a predetermined value or more due to generation of heat or the like and eject gas or the like from the inside of the capacitors 10. The capacitors 10 are connected to each other in series by power source patterns on the later-described circuit board 30, and are connected to the outside from the electrodes 12AP and 12CN at the two ends via a connector 40 installed on the circuit board.

Figure 4:
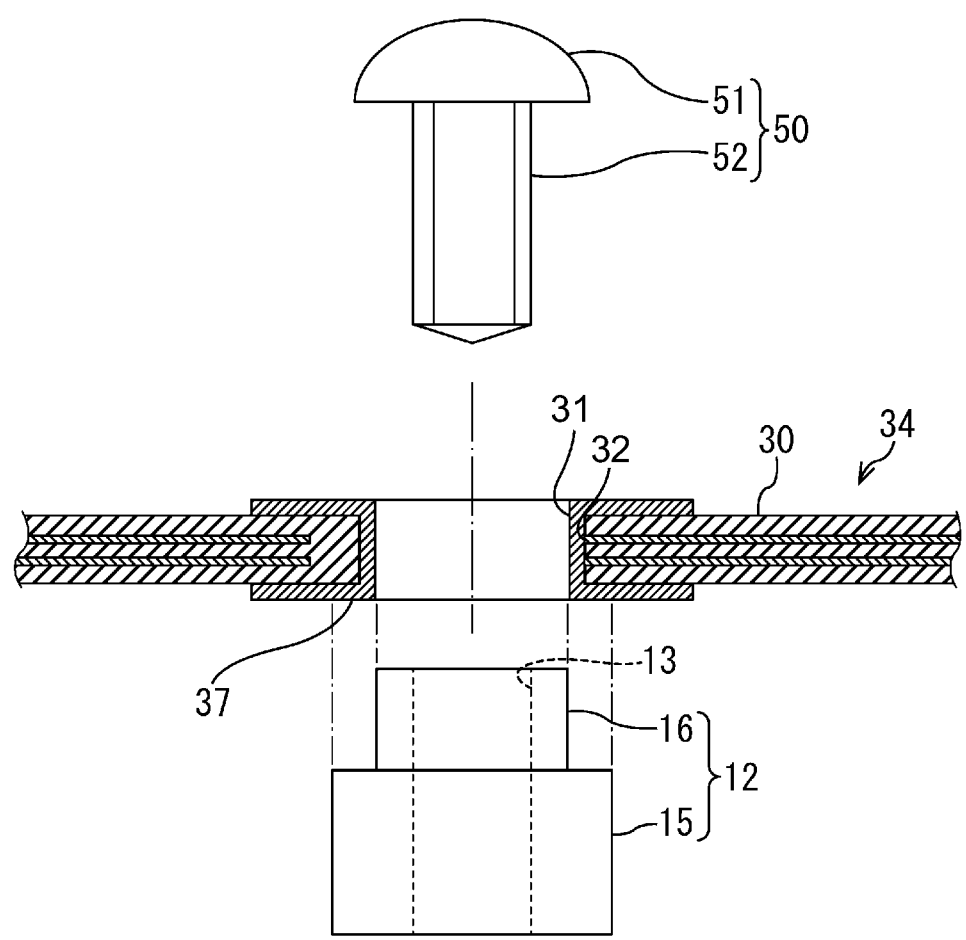
FIG. 4 is an exploded front view of a connection structure between electrodes.

As shown in FIG. 4, the electrodes 12 are each formed of relatively solid metal, and are each provided with a base portion 15 protruding from the capacitor 10 and a spacer portion 16 that protrudes from the base portion 15 and has a diameter smaller than that of the base portion 15, in one piece. An insertion hole 13 for insertion of the bolt 50 is formed in the electrode 12.

As shown in FIG. 2, the caps 20 each include a disc-shaped cap body 20A and a circumferential wall portion 20B that extends downward from the circumferential edge of the cap body 20A and surrounds the circumferential face of the capacitor 10. The cap body 20A is placed on the upper face of the capacitor 10 in a state in which the electrodes 12 are inserted into two hole portions 21.

Figure 3:
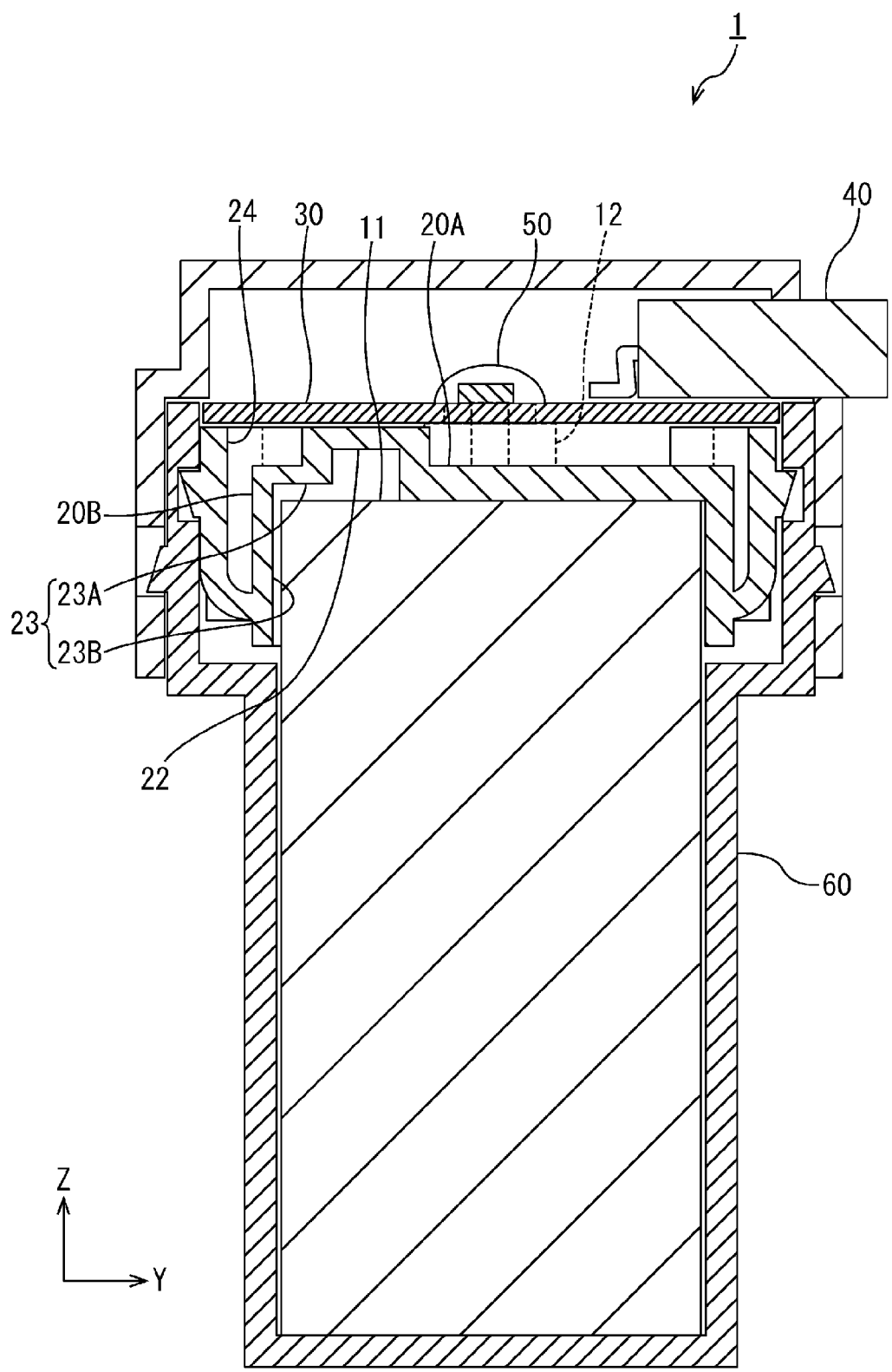
FIG. 3 is a cross-sectional view taken along line B-B in FIG. 1.

As shown in FIG. 3, a safety cover portion 22 is provided rearward of the hole portions 21 and is arranged between the safety valve 11 and the circuit board 30. The safety cover portion 22 has a shape obtained by recessing the lower face of the cap body 20A into a circular shape, and the upper face side of the safety cover portion 22 is formed to be slightly higher than the upper face of the cap body 20A. In this manner, the safety cover portion 22 is provided with a thickness that is similar to that of the cap body 20A.

Furthermore, a release groove portion 23 for guiding gas ejected from the safety valve 11 in the direction away from the circuit board 30 is provided on the inner side of the cap 20 (side that opposes the capacitor 10). The release groove portion 23 includes a horizontal release portion 23A that extends rearward from the safety cover portion 22 and a vertical release portion 23B that extends downward from the rear end of the horizontal release portion.

The horizontal release portion 23A is provided continuously from the safe cover portion 22, and has a shape obtained by recessing the lower face of the cap body 20A into a groove. The vertical release portion 23B is provided continuously from the rear end of the horizontal release portion 23A and has a shape obtained by recessing the inner wall of the circumferential wall portion 20B of the cap 20 into a groove. In this manner, a space defined between the safety cover portion 22 and the capacitor 10 is in communication with a space below the cap 20 via a space defined between the horizontal release portion 23A and the capacitor 10 and a space defined between the vertical release portion 23B and the capacitor body portion. Gas ejected from the safety valve 11 flows through these spaces (i.e., guided by the safety cover portion 22 and the release groove portion 23 in the direction away from the circuit board 30), and then is released to the space below the cap 20.

Locking portions 24 respectively extend from the front and rear ends of the circumferential wall portion, and locking pieces provided near the tips of locking portions 24 are locked in locked portions provided near the upper end of the case 60, from the inside. Also, on the front and rear sides of the cap body 20A, a pair of support ribs 25 (an example of a circuit board support portion) stand upward and extend in the front-rear direction. The support ribs 25 are interposed between the guide ribs 62 of the case 60 in the left-right direction, and support the later-described circuit board 30.

The circuit board 30 is shaped like a rectangular flat plate that is slightly smaller than the opening in the upper face of the case 60, is fitted into the case 60, and supported by the base portions 15 of the electrodes 12 and the support ribs 25 of the caps 20. A plurality (in the present embodiment, six) of through holes 31 are provided side by side in the circuit board 30.

The through holes 31 are each shaped like a circle having a diameter that is slightly larger than that of the spacer portion 16 of the electrode 12 and smaller than that of the base portion 15 of the electrode 12. The spacer portions 16 are inserted into the through holes 31 in the circuit board 30.

The upper opening of the above-described through hole 13 is exposed in the spacer portion 16 arranged in the through hole 31, and the bolt 50 is inserted into the opening, thereby fastening the circuit board 30 to the electrode 12. The bolt 50 is a known bolt including a head portion 51 (an example of a pressing portion) and a shaft portion 52 formed in one piece with the head portion 51. The shaft portion 52 of the bolt 50 is inserted and screwed into the electrode 12, whereas the head portion 51 is in contact with the upper face of the circuit board 30 and presses the circuit board 30 to the base portion 15 of the electrode 12. The lower face of the head portion 51 is also in contact with and is supported by the upper face of the spacer portion 16 of the electrode 12.

Note that the inner circumferential face (inner wall) of the through hole 31 is provided with a conductive plating layer 32. Hereinafter, the thickness of the plating layer 32 is not considered, and the description will be given assuming that the inner circumferential face of the plating layer 32 corresponds to the inner circumferential face of the through hole 31.

Figure 5:
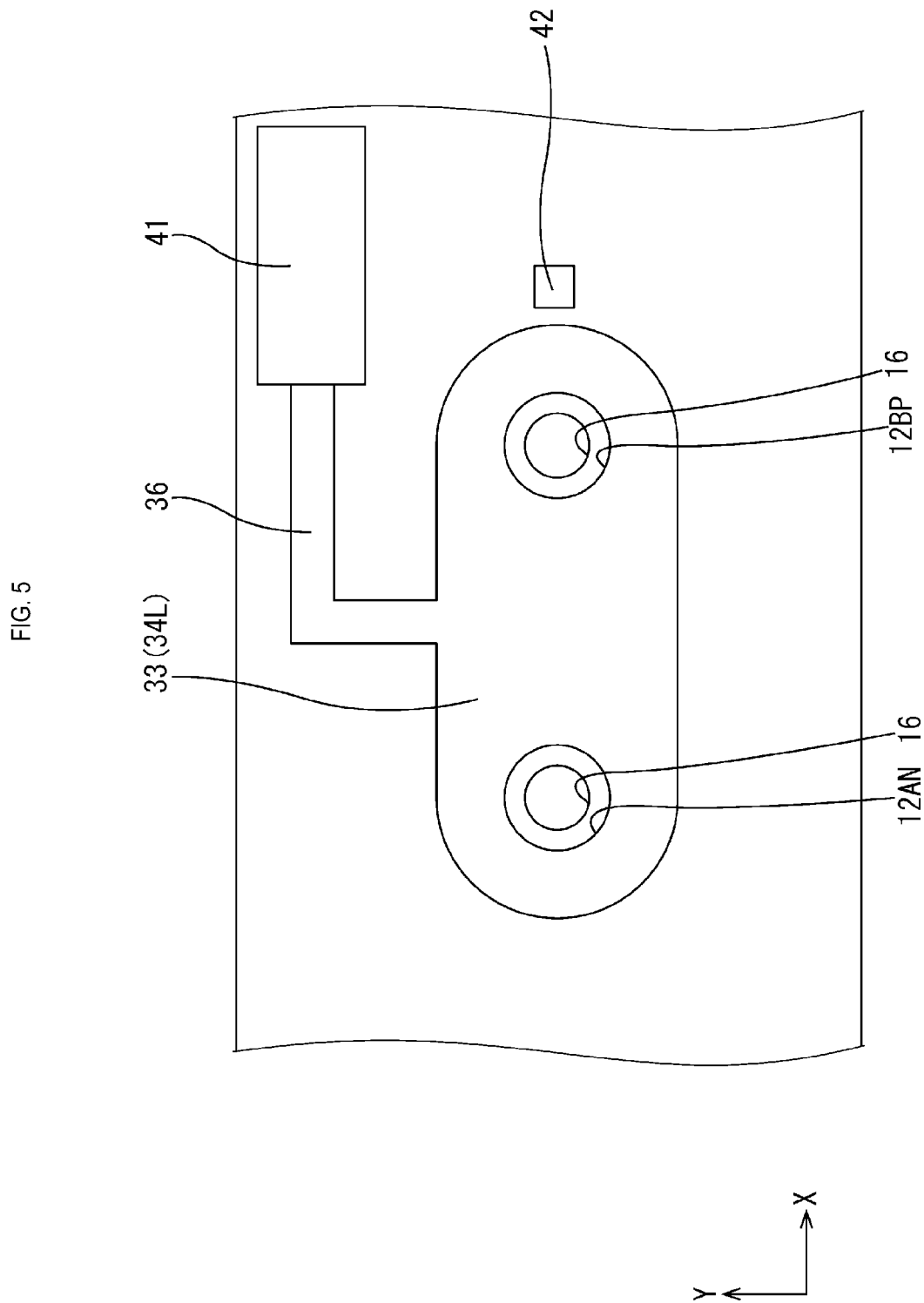
FIG. 5 is a top view showing a power source pattern and a signal pattern.

Now, as shown in FIG. 5, the circuit board 30 includes a power source pattern for conducting electric power from the capacitor 10 and a signal pattern 36 for conducting signals related to the state of the capacitor 10. The power source pattern includes an inter-electrode pattern 34 for connecting the adjacent electrodes 12 to each other.

Figure 6:
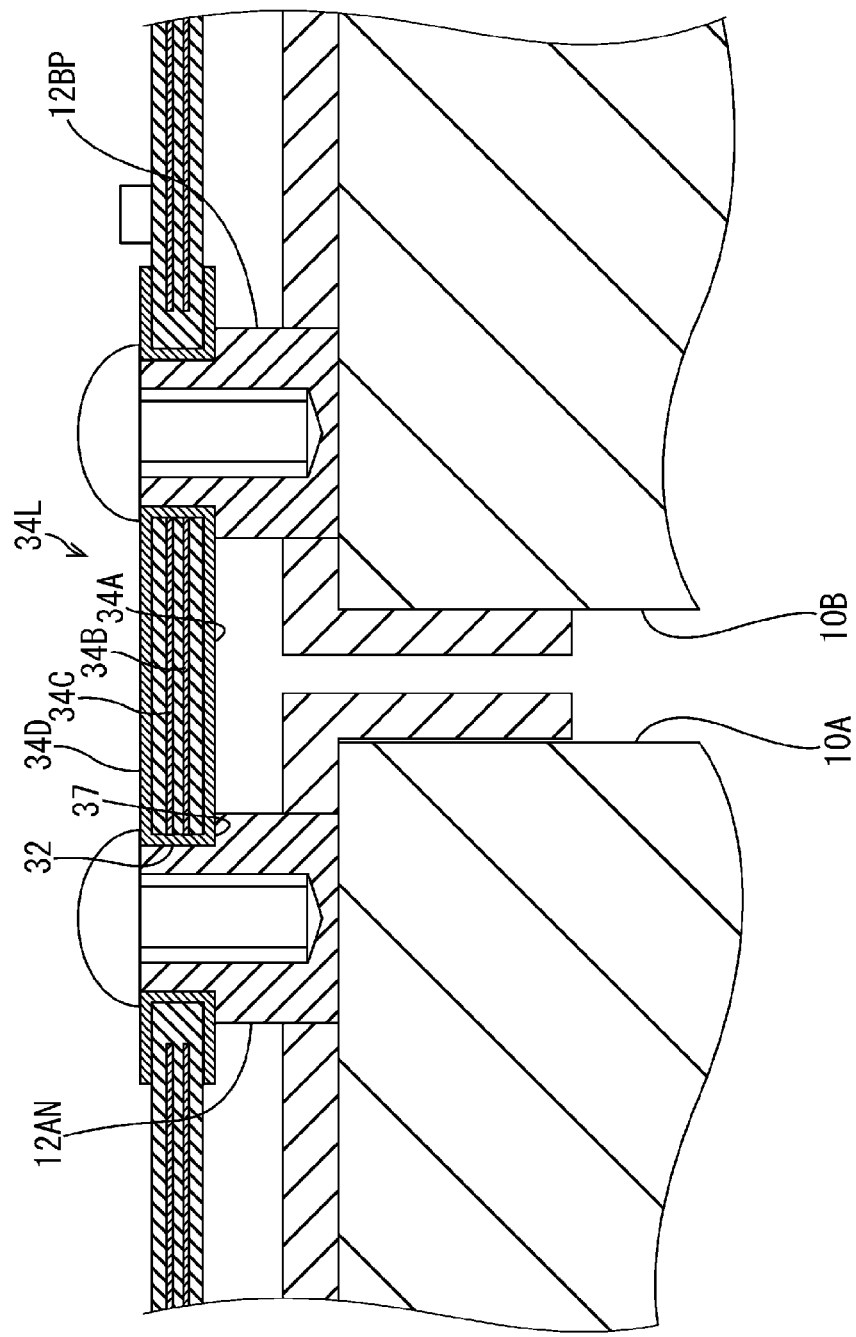
FIG. 6 is a front view showing the connection structure between the electrodes.

As shown in FIGS. 5 and 6, the inter-electrode pattern 34 is formed so as to reach the region surrounding the one through hole 31 to the region surrounding the adjacent through hole 31. In the present embodiment, an oval inter-electrode pattern 34L surrounds a negative electrode 12AN of a first capacitor 10A and a positive electrode 12BP of a second capacitor 10B, and similarly, an oval inter-electrode pattern 34R surrounds a negative electrode 12BN of the second capacitor 10B and a positive electrode 12CP of a third capacitor 10C. Since the inter-electrode pattern 34L and the inter-electrode pattern 34R have the same configuration, the inter-electrode pattern 34R is not described and not shown in the drawings.

Note that the circuit board 30 of the present embodiment is a stacked circuit board formed by a plurality of power source patterns being stacked via insulative layers. As shown in FIG. 6, the inter-electrode pattern 34L is formed by inter-electrode patterns 34A to 34D having a similar shape being vertically stacked, and the first inter-electrode pattern 34A (an example of a first power source pattern), which is on the lowermost layer, is provided with contact portions 37 that are exposed on the underside face of the circuit board 30 and that are electrically connected to the electrodes 12 by being pressed to the electrodes 12 with the bolts 50 via the circuit board 30. The inter-electrode patterns 34A to 34D are electrically connected to the plating layers 32 of the through holes 31, thereby forming one connection conductor as a whole. In other words, the two electrodes 12 are directly connected to each other by the first inter-electrode pattern 34A, and are connected to each other by the second inter-electrode patterns 34B to 34D (an example of second power source pattern), that are on the upper layers, via the plating layer 32.

Note that although the first inter-electrode pattern 34A is entirely exposed on the lower side of the circuit board 30 in the present embodiment, a configuration is also possible in which, for example, only the contact portions 37 (region to be pressed to the electrode 12) of the first inter-electrode pattern 34A are exposed and the portion formed between the contact portions 37 is embedded in the circuit board 30. If any of the second inter-electrode patterns 34B to 34D are formed, only the contact portions 37 of the first inter-electrode pattern 34A are formed and the portion between the contact portions 37 may also be omitted. In this manner, it is possible to reduce the area occupied by the first inter-electrode pattern 34A on the lower side of the circuit board 30, and to enhance flexibility in the design of the installation positions of other electric components and the like.

Furthermore, although it is desirable that the inter-electrode pattern 34 has a cross-sectional area that corresponds to the amount of current obtained from the capacitors 10, if the circuit board 30 is used only for a short time as a sub power supply as in the present embodiment, the inter-electrode pattern 34 need not have a cross-sectional area that corresponds to the amount of current obtained from the capacitors 10.

Furthermore, the number of the layers of the second inter-electrode patterns 34B to 34D is not limited to three as described above, and can be determined as appropriate in accordance with the required allowable current. A configuration is also possible in which the second inter-electrode pattern 34 is not provided. If the second inter-electrode pattern 34 is not provided, the plating layer 32 of the through hole 31 need not be provided.

External connection patterns separately surround the electrodes 12 at the two ends in the capacitor 10 (the positive electrode 12AP of the first capacitor 10A and the negative electrode 12CN of the third capacitor 10C), and extend toward the region of the external power output terminal (not shown) of the connector 40. Since the external connection patterns have the same configuration as the inter-electrode pattern 34 other than that they each surround only one electrode 12, the description thereof will be omitted and they are not shown in the drawings.

A signal pattern 36 electrically connects a control apparatus (e.g., ECU (Electronic Control Unit) or the like) for controlling the operation of the capacitors 10 and the electrodes 12. In the present embodiment, a balance circuit 41 (an example of a control circuit) is formed on the circuit board 30 as part of the control apparatus, and balances the state of the capacitors 10 based on the state of the capacitors 10. As shown in FIG. 5, the signal pattern 36 is formed by connecting this balance circuit 41 to the above-described inter-electrode pattern 34L.

Note that the connector 40 includes a signal terminal as well as the above-described external power output terminal. In addition, a thermistor 42 for detecting the temperature of the capacitors 10 is also installed on the circuit board 30. The connector 40 is arranged near the center at the front end of the circuit board 30 (position shown by the two-dot chain line C in FIG. 1). The thermistor 42 is arranged between the positive electrode 12BP and the negative electrode 12BN of the second capacitor 10B, and the detected temperature of the second capacitor 10B is considered to be the temperature of the capacitors 10. Although the signal patterns 36 are formed between these installed parts and the balance circuit 41 as well, they are not shown in the drawings.

Next, a procedure for assembling the power storage module 1 of the present embodiment will be described.

First, the capacitors 10 are housed in the capacitor housing portions 61 of the case 60, and the positive electrodes P and the negative electrodes N are alternatingly arranged side by side. Next, the base portions 15 of the electrodes 12 are inserted into the hole portions 21 of the caps 20, the locking portions 24 are fitted between the guide ribs 62 of the case 60, and the locking claws are locked into the locked portions of the case 60. In this manner, the capacitors 10 are covered with the caps 20, and the safety cover portions 22 are fixed to the case 60 in the state where the safety valves 11 are covered with the safety cover portions 22.

Next, as shown in FIG. 4, the spacer portions 16 of the electrodes 12 are inserted into the through holes 31 of the circuit board 30, and the circuit board 30 is placed on the base portions 15 of the electrodes 12.

Finally, the bolts 50 are inserted into the insertion holes 13 of the electrodes 12, and screwed into the electrodes 12. By doing so, the circuit board 30 is held between the head portions 51 of the bolts 50 and the base portions 15 of the electrodes 12, and the head portions 51 of the bolts 50 come in contact with the upper faces of the spacer portions 16 and are supported by the spacer portions 16. Accordingly, the contact portions 37 of the first inter-electrode pattern 34A are pressed against the base portions 15 of the electrodes 12, and the electrodes surrounded by the inter-electrode pattern 34 are connected to each other. As described above, the power storage module 1 is complete in which the capacitors 10 are reliably connected to each other by the connection structure including a circuit board that includes the through holes 31 and the inter-electrode patterns 34A and that is placed on the capacitors 10, the bolts 50 that each include a shaft portion 52 that is inserted into the through hole 31 and screwed into the electrodes 12 of the capacitor 10 and a head portion 51 that is formed in one piece with the shaft portion 52 and presses the inter-electrode pattern 34A to the electrode 12, and the spacer portions 16 that are arranged in the through holes 31 and support the head portions 51.

According to the power storage module 1 of the present embodiment, it is possible to fix the circuit board 30 to the capacitors 10 and reliably connect the electrodes 12 to each other by merely fitting the capacitors 10 and the circuit board 30 into the case 60 and screwing the bolts 50 thereto. Accordingly, the number of parts and man-hours are smaller and cost-performance is higher than a case in which the bus bar 170 and the circuit board 30 are separately fixed to the capacitors 10, for example.

Furthermore, since the balance circuits 41 for controlling the state of the capacitors 10 are directly formed on the circuit board 30, and the signal patterns 36 for connecting the balance circuits 41 to the power source patterns are also directly formed on the circuit board 30, there is no need to separately provide a detection wire for connection, compared to a case in which, for example, the balance circuits 41 are externally provided.

Furthermore, since the caps 20 include the support ribs 25, it is possible to suppress rattling of the circuit board 30 and reliably hold the connection with the electrodes 12. Also, since the caps 20 cover the safety valves 11 of the capacitors 10, it is possible to prevent gas ejected from the safety valves 11 from being blown directly to the circuit board 30, and thus it is possible to guarantee control by the circuit board 30 even when the capacitors 10 are in an abnormal state.

Second Embodiment

Figure 7:
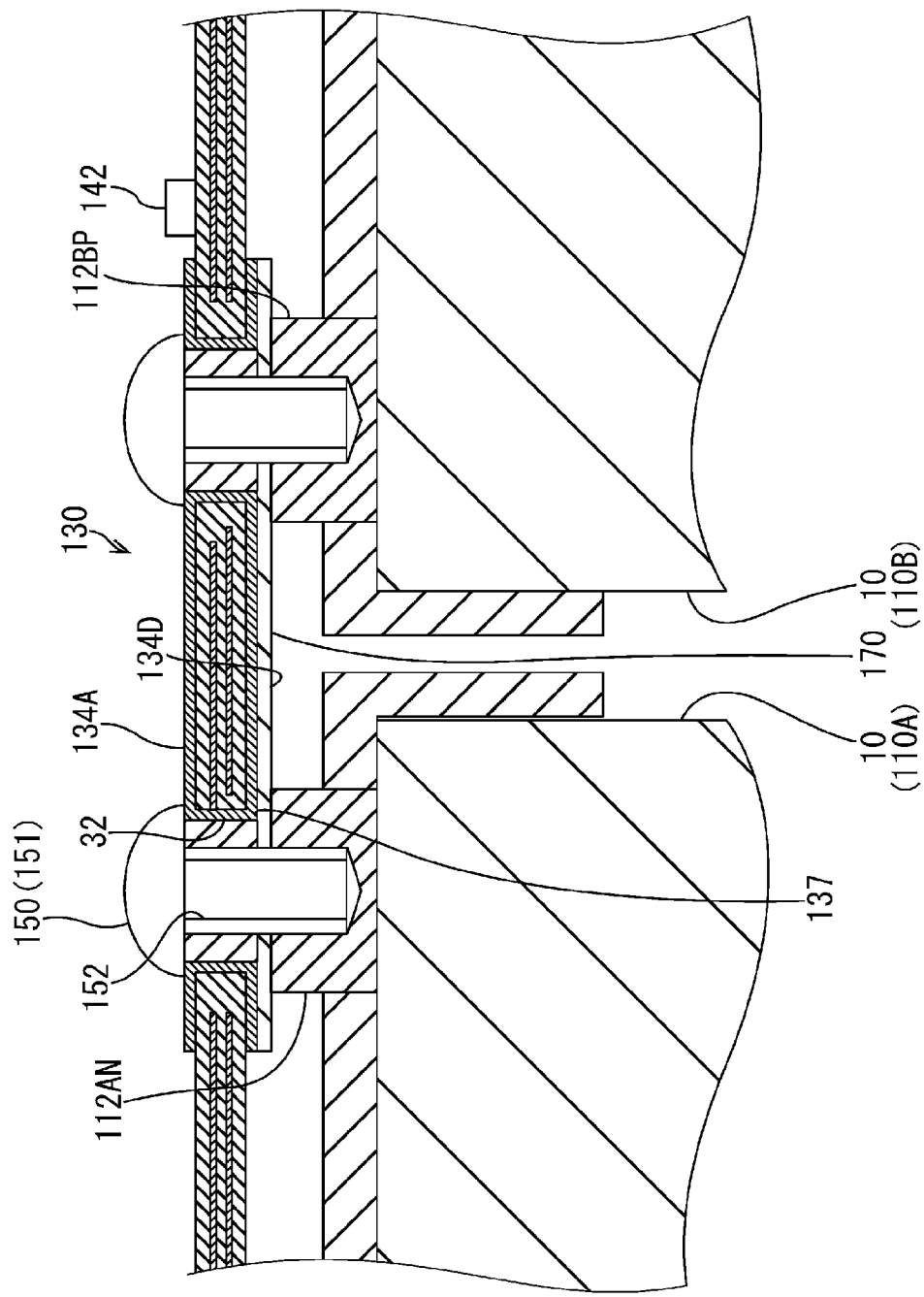
FIG. 7 is a top view showing a power storage module of a second embodiment.

Next, a second embodiment according to a technology disclosed in the present specification will be described with reference to FIG. 7.

In the present embodiment, the inter-electrode pattern 134 is formed by only two layers, namely, 134A formed on the lower side of the circuit board 130 and 134D formed on the upper side, and a bus bar 170 provided with through holes 131 is arranged between the circuit board 130 and electrodes 112, and is connected to the electrodes 112 and the circuit board 130 with bolts 150. In this manner, the configuration in which the bus bar 170 is additionally provided is favorable when an allowable current that surpasses the power source pattern 133 (134) formed in advance on the circuit board 30 is needed. According to the present embodiment, it is possible to use the same bolt to fasten the bus bar 170 and fasten the circuit board 130, and thus the number of parts can be reduced.

The other configurations of the present embodiment are the same as those of the first embodiment, and thus are denoted by the reference numerals that are same as the first embodiment and description thereof is omitted.

Other Embodiments

The technology disclosed in the present specification is not limited to the embodiments that have been described so far with reference to the drawings, and can be implemented in the following forms, for example.

In the above-described embodiments, the plurality of capacitors 10 are arranged side by side and these are connected in series with the power source patterns. However, the number and arrangement of the power storage elements are not limited to this. A configuration is also possible where, for example, six power storage elements are arranged in two rows each constituted by three power storage elements, the power storage elements in each row are connected to each other in series, and the rows are connected in parallel. In this case, the power source patterns arranged at the two ends of the power storage element group may also be formed by integrally forming the inter-electrode patterns connecting the electrodes of the terminals in the rows to each other and the external connection patterns for connecting the electrodes to the external apparatuses.

Also, the number of the power storage elements (electrodes) connected by one power source pattern is not limited to two. A configuration is also possible where, for example, three power storage elements (three electrodes) are connected to one power source pattern.

In the above-described embodiments, one through hole 31 is arranged to correspond to one electrode 12 of the capacitors 10. However, the through holes are not limited to this configuration. A configuration is also possible where a single through hole having a laterally elongated oval shape is provided and the electrodes are inserted into the regions at the two ends of the through hole.

In the above-described embodiments, the bolt 50 is used as a fastening member, but the fastening member is not limited to this configuration. A configuration is also possible where the fastening member is constituted by a shaft member that is inserted into the insertion hole and screwed into the electrode, and a nut that is formed in one piece with the shaft member and comes in contact with the circuit board by being screwed into the upper end region of the shaft member.

In the above-described embodiments, the spacer portion 16 is formed in one piece with the base portion 15 of the electrode 12. However, a spacer portion (e.g., collar, etc.) separate from the electrode (base portion) can also be adopted. In this case, since the material of the spacer portion can be selected with preference given to robustness over conductivity, the head portion of the fastening member can be more reliably supported.

In the above-described embodiments, the through hole 31 of the circuit board 30 is provided with a plating layer 32, and by doing this, the power source patterns formed in the plurality of layers are electrically connected. However, if the spacer and the power source patterns in the layers are reliably connected and the spacer has a sufficient conductivity, the plating layer 32 can be omitted. In this case, the spacer is part of a connection conductor for connecting the electrodes.

The invention claimed is:

1. A connection structure for connecting electrodes of a plurality of power storage elements, the connection structure comprising:
   a circuit board that includes power source patterns and through holes into which the electrodes are inserted, the circuit board being placed on the power storage elements;
   fastening members that include shaft portions that are inserted into the through holes and screwed into the electrodes of the power storage elements, and pressing portions that are formed integrally with the shaft portions and press the power source patterns to the electrodes via the circuit board, and
   spacers that are arranged in the through holes and support the pressing portions and integrally formed to the electrodes.

2. The connection structure of the power storage elements according to claim 1,
   wherein the power source patterns each include a plurality of contact portions that are exposed on a surface of the circuit board, and
   the fastening members respectively press the contact portions to the electrodes of the plurality of power storage elements via the circuit board.

3. The connection structure of the power storage elements according to claim 2, wherein control circuits for controlling a state of the power storage elements are provided on the circuit board, and a signal pattern that connects the power source patterns to the control circuit is formed on the circuit board.

4. The connection structure of the power storage elements according to claim 1,
   wherein conductive plating layers are formed on inner walls of the through holes, and
   the power source patterns each include a first power source pattern that is arranged on the electrode side and is pressed to the electrode, and a second power source pattern that is stacked on the first power source pattern via an insulative layer and is electrically connected to the first power source pattern via the plating layer.

5. The connection structure of the power storage elements according to claim 4, wherein control circuits for controlling a state of the power storage elements are provided on the circuit board, and a signal pattern that connects the power source patterns to the control circuit is formed on the circuit board.

6. The connection structure of the power storage elements according to claim 1, wherein control circuits for controlling a state of the power storage elements are provided on the circuit board, and a signal pattern that connects the power source patterns to the control circuit is formed on the circuit board.

7. The connection structure of the power storage elements according to claim 1, wherein the spacer is formed of an electrically conductive material.

8. A power storage module comprising:
   a plurality of power storage elements;
   a case that houses the plurality of power storage elements;
   a circuit board that includes power source patterns and through holes into which the electrodes of the power storage elements are inserted;
   fastening members that include shaft portions that are inserted into the through holes and are screwed into the electrodes of the power storage elements and pressing portions that are formed integrally with the shaft portions and press the power source patterns to the electrodes of the power storage elements via the circuit board;
   spacers that are arranged in the through holes and support the pressing portions, the spacers integrally formed to the electrodes; and
   caps that are arranged between the power storage elements and the circuit board,
   wherein the power storage elements each include a safety valve that is opened when an internal pressure is greater than or equal to a predetermined value, and
   the caps each include a cover portion that is arranged between the circuit board and the safety valve and that covers the safety valve, and a release groove portion that guide gas discharged from the safety valve in the direction away from the circuit board.

9. The power storage module according to claim 8, wherein the circuit board is supported by the electrodes and circuit board support portions that protrude from the caps.

10. The power storage module according to claim 8, wherein the spacer is formed of an electrically conductive material.

* * * * *